US008120525B2

(12) United States Patent
Ridenour et al.

(10) Patent No.: US 8,120,525 B2
(45) Date of Patent: Feb. 21, 2012

(54) SYSTEMS AND METHODS FOR OBTAINING AIRCRAFT STATE DATA FROM MULTIPLE DATA LINKS

(75) Inventors: Richard D. Ridenour, Glendale, AZ (US); Charles C. Manberg, Peoria, AZ (US)

(73) Assignee: Aviation Communication&Surveillance Systems LLC, Phoenix, AZ (US)

( * ) Notice: Subject to any disclaimer, the term of this patent is extended or adjusted under 35 U.S.C. 154(b) by 267 days.

(21) Appl. No.: 12/364,312

(22) Filed: Feb. 2, 2009

(65) Prior Publication Data

US 2009/0195436 A1 Aug. 6, 2009

Related U.S. Application Data

(60) Provisional application No. 61/025,262, filed on Jan. 31, 2008.

(51) Int. Cl.
*G01S 13/93* (2006.01)

(52) U.S. Cl. ................ 342/30; 342/32; 342/42; 342/43; 342/46

(58) Field of Classification Search .............. 342/29–32, 342/42–43, 46
See application file for complete search history.

(56) References Cited

U.S. PATENT DOCUMENTS

| | | | | |
|---|---|---|---|---|
| 6,271,768 | B1 * | 8/2001 | Frazier et al. | 340/961 |
| 6,459,411 | B2 * | 10/2002 | Frazier et al. | 342/455 |
| 6,657,578 | B2 * | 12/2003 | Stayton et al. | 342/30 |
| 6,799,114 | B2 * | 9/2004 | Etnyre | 701/120 |
| 7,724,178 | B2 * | 5/2010 | Brandao et al. | 342/29 |
| 7,912,593 | B2 * | 3/2011 | Ridenour | 701/3 |
| 7,961,135 | B2 * | 6/2011 | Smith et al. | 342/29 |
| 7,963,618 | B2 * | 6/2011 | Stone et al. | 301/16 |
| 7,969,346 | B2 * | 6/2011 | Franceschini et al. | 342/30 |
| 8,004,452 | B2 * | 8/2011 | Rolfe et al. | 342/37 |
| 8,019,529 | B1 * | 9/2011 | Sharma et al. | 701/117 |
| 2009/0027254 | A1 * | 1/2009 | Troxel | 342/30 |
| 2009/0140910 | A1 * | 6/2009 | Bailly et al. | 342/40 |
| 2009/0184862 | A1 * | 7/2009 | Stayton et al. | 342/30 |
| 2009/0195436 | A1 * | 8/2009 | Ridenour et al. | 342/30 |
| 2009/0322586 | A1 * | 12/2009 | Lanzkron | 342/36 |
| 2009/0322587 | A1 * | 12/2009 | Stayton | 342/37 |
| 2009/0322588 | A1 * | 12/2009 | Rolfe et al. | 342/37 |
| 2009/0322589 | A1 * | 12/2009 | Dooley | 342/37 |
| 2010/0039310 | A1 * | 2/2010 | Smith et al. | 342/29 |
| 2010/0085236 | A1 * | 4/2010 | Franceschini et al. | 342/30 |
| 2011/0128180 | A1 * | 6/2011 | Fiori et al. | 342/93 |

* cited by examiner

*Primary Examiner* — John Sotomayor
(74) *Attorney, Agent, or Firm* — Allen J. Moss; Squire Sanders (US) LLP

(57) ABSTRACT

Systems and methods are delineated that may provide for a system for use in a merging and spacing application for an aircraft. An exemplary system may comprise a TCAS and a processor for executing the merging and spacing application using ADS-B data and data received by the aircraft in response to an interrogation of another aircraft from the TCAS. In a disclosed embodiment, a lead aircraft responds to the TCAS interrogation from a following aircraft to provide EHS heading and/or speed of the lead aircraft to the following aircraft, which uses the received EHS data as well as ADS-B data to determine merging and spacing control parameters for the following aircraft.

1 Claim, 2 Drawing Sheets

SYSTEMS AND METHODS FOR OBTAINING AIRCRAFT STATE DATA FROM MULTIPLE DATA LINKS

CROSS REFERENCE TO RELATED APPLICATIONS

This application claims priority from U.S. Provisional Application. No. 61/025,262, filed Jan. 31, 2008 and entitled "SYSTEMS AND METHODS FOR OBTAINING AIRCRAFT STATE DATA FROM MULTIPLE DATA LINKS," which is incorporated herein by reference in its entirety.

BACKGROUND OF THE INVENTION

1. Field of the Invention

The present invention relates to systems and methods for obtaining aircraft state data and, more particularly, to systems and methods for obtaining aircraft state data from multiple data links.

2. Description of the Related Art

Current merging and spacing designs based on Automatic Dependent Surveillance—Broadcast (ADS-B) data are performance limited by the aircraft parameters that are available from the designated traffic to follow ADS-B data set. Performance of the merging and spacing operation can be improved significantly by incorporating additional aircraft parameters from the traffic to follow into the design. This would require the addition of these new aircraft parameters in the traffic to follow ADS-B output. Since there is a restriction on the bandwidth of the 1090 Mhz frequency used for transmitting ADS-B data, providing the new ADS-B data parameters would violate the standard limitation. Since eventually all aircraft will be transmitting ADS-B continuously, the addition of even one new parameter to the ADS-B data set will result in significantly more messages that need to be sent on the frequency periodically. Additionally, due to the fact that each aircraft transmits its data asynchronously, an increase in the number of parameters that are transmitted by all aircraft will increase the probability that two aircraft transmit a message simultaneously, resulting in both messages being unreadable by other aircraft.

SUMMARY OF THE INVENTION

In accordance with a first embodiment of the present invention, a system is disclosed for use in a merging and spacing application for an aircraft, the system comprising a TCAS and a processor for executing the merging and spacing application using ADS-B data and data received by the aircraft in response to an interrogation of another aircraft from the TCAS.

It is to be understood that both the foregoing general description and the following detailed description are exemplary and explanatory only and are not restrictive of the invention, as now or later claimed.

The accompanying drawing, which is incorporated in and constitute a part of this specification, illustrates several embodiments of the invention and together with the description, serve to explain the principles of the invention.

DESCRIPTION OF THE EMBODIMENTS

Reference will now be made in detail to the present exemplary embodiments of the invention, examples of which are illustrated in the accompanying drawing.

An improved merging and spacing design would be to combine or integrate the limited ADS-B data with other sources of aircraft data to allow the in-trail aircraft to have more complete data about the traffic to follow.

One such data source is to use a technology know as Mode S Elementary Surveillance (ELS)/Enhanced Surveillance (EHS) in combination with the aircraft's Traffic Collisions and Avoidance System (TCAS) capability to interrogate other aircraft transponders.

Elementary Surveillance (ELS)/Enhanced Surveillance (EHS) is a system currently used in Europe to allow Air Traffic Control on the ground to request additional aircraft data parameters from an aircraft's Mode S transponder for improved tracking of airborne traffic. The ground-based Air Traffic Control system can send an interrogation (on 1030 MHz) to a specific aircraft to request that specific aircraft to transmit particular data items. Since the data item is only transmitted by the specific aircraft that was interrogated and only at the time it was interrogated, there is less congestion on the 1090 MHz frequency, as compared to a situation where all aircraft were periodically transmitting the data.

An improved merging and spacing system could make use of the Enhanced Surveillance protocol and selectively interrogate the lead ship to obtain additional data that was not available over ADS-B. An improved merging and spacing system could combine data from ADS-B, Enhanced Surveillance, and potentially other sources, to better calculate a required speed target. This would result in better aircraft spacing, better efficiency, less accelerations and decelerations, and higher comfort for the occupants of the aircraft.

Figure 1:
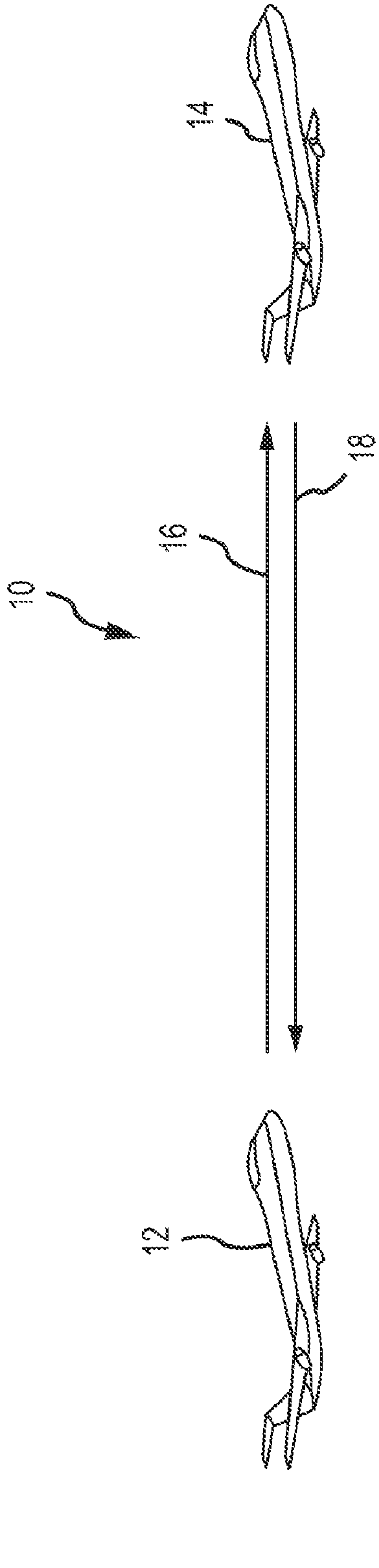
FIG. 1 is simplified schematic of an aircraft employing systems and methods consistent with the present invention.
Figure 2:
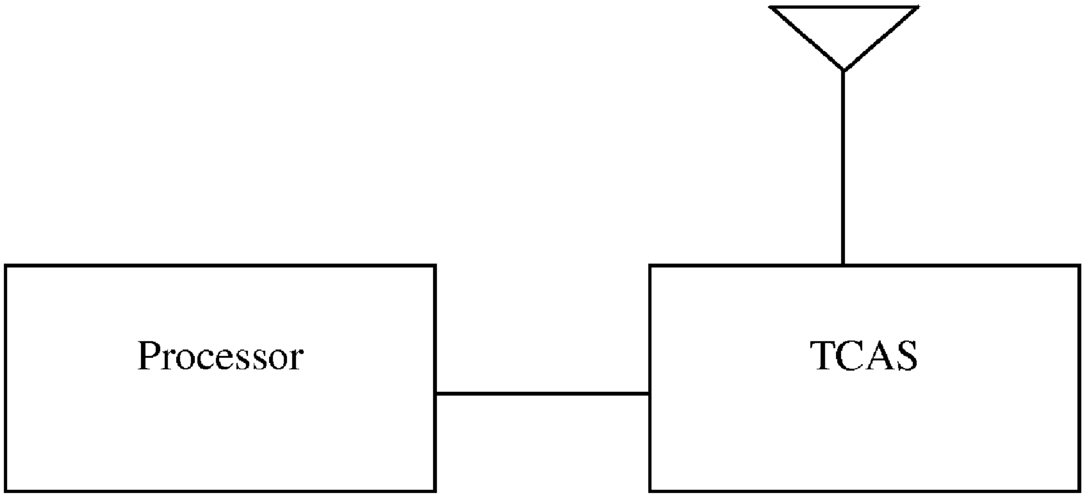
FIG. 2 is a simplified diagram depicting an embodiment of a system consistent with the present invention.

For example, with reference to FIG. 1, an exemplary system 10 is shown in which an aircraft 12 leads (a leading aircraft) aircraft 14 (a following aircraft). The following aircraft 12 may include a TCAS (not shown) and a processor (not shown). The processor may be part of or separate from the TCAS and may be employed to determine merging a spacing parameters, such as a speed to maintain a desired separation between the two aircraft 12 and 14. The TCAS may interrogate 16 aircraft 14 for a supplemental data transmission 18, such as speed and/or heading of aircraft 14, as may be reported by a supplemental network such as Mode S Elementary Surveillance (ELS)/Enhanced Surveillance (EHS). A supplemental data transmission may comprise any that may supplement data that may provided by an ADS-B transmission. As such, following aircraft 12 may employ data received from leading aircraft 14 on ADS-B as well as data received in supplemental data transmission 18 to determine merging a spacing parameters, such as a speed to maintain a desired separation between the two aircraft 12 and 14.

This concept could be applied to any ADS-B application whose performance could be improved by providing the additional data available from ELS/EHS technology or from any other data source that can supplement the ADS-B application.

Other embodiments of the invention will be apparent to those skilled in the art from consideration of the specification and practice of the invention disclosed herein. It is intended that the specification and examples be considered as exemplary only, with a true scope and spirit of the invention being indicated by the following claim and any subsequently filed claims.

What is claimed is:

1. A system for use in a merging and spacing application for an aircraft, comprising:

a TCAS; and a processor for executing the merging and spacing application using ADS-B data and data received by the aircraft in response to an interrogation of another aircraft from the TCAS.

* * * * *